United States Patent [19]

Saso

[11] Patent Number: 5,061,002
[45] Date of Patent: Oct. 29, 1991

[54] PARTITION PLATE FOR AUTOMOTIVE VEHICLE

[75] Inventor: Hitoshi Saso, Kanagawa, Japan

[73] Assignee: Ikeda Bussan Co., Ltd., Ayase, Japan

[21] Appl. No.: 618,927

[22] Filed: Nov. 28, 1990

[30] Foreign Application Priority Data

Mar. 22, 1990 [JP]  Japan ............................ 2-29271[U]

[51] Int. Cl.$^5$ ............................................. B62D 43/10
[52] U.S. Cl. .................................. 296/37.3; 296/37.14
[58] Field of Search .................. 296/37.3, 37.14; 16/4, 16/7

[56] References Cited

U.S. PATENT DOCUMENTS

| 2,657,948 | 11/1953 | Sturtevant | 16/4 X |
| 4,226,461 | 10/1980 | Ackel | 296/37.14 |
| 4,398,765 | 8/1983 | Ishikawa | 296/37.14 X |
| 4,653,138 | 3/1987 | Carder | 16/4 |

Primary Examiner—Margaret A. Focarino
Assistant Examiner—Gary C. Hoge
Attorney, Agent, or Firm—Foley & Lardner

[57] ABSTRACT

A partition plate for a luggage compartment of an automotive vehicle is detachable from the automotive vehicle and serves as a table of a reversible type in the outdoors. The partition plate comprises a board whose one surface is covered with a carpet. The peripheral section of the carpet extends to a side peripheral surface of the board and is covered with a garnish secured on the other surface of the board.

14 Claims, 5 Drawing Sheets

PARTITION PLATE FOR AUTOMOTIVE VEHICLE

BACKGROUND OF THE INVENTION

1. Field of the Invention

The present invention relates to improvements in a partition plate which is used to divide a luggage compartment of an automotive vehicle into a main compartment and a sub-compartment for storing a spare tire and the like.

2. Description of the Prior Art

It is well known that a partition plate for dividing a luggage compartment is used in automotive vehicle. Since such a partition plate has a relatively large flat surface and is detachable so that it can be removed from the luggage compartment. It has been proposed that the partition plate be used as a table in the outdoors upon being removed from the luggage compartment since the partition plate is reversibly usable.

An example of such a conventional partition plate is shown in FIG. 8 of the present application, in which a partition plate 6 is detachably installed on a luggage floor 4 of a luggage compartment. A sub-compartment 5 over which the partition plate 6 is disposed is formed under the luggage floor 4.

The partition plate 6 is tightly provided with carpet 8 under the action of adhesive and the like and fitted on an upper opening step section 5a of the sub-compartment 5.

The partition plate 6 includes a board 7 made of plastics and formed with a hollow therein so that the partition plate 6 is light in weight. The upper opening step section 5a has a hole (not shown) for a locking device 9. The carpet 8, attached on the partition plate 6, is the same as that of the luggage floor 5 so that the board 7 looks as if it is integral with the luggage floor 4 when the partition plate 6 is fit onto the upper opening step section 5a.

However, with this conventional arrangement, it is difficult to attach the carpet 8 on the board 7 with the adhesive in a manner that a peripheral edge section 8a of the carpet 8 is formed straight. Furthermore, the peripheral edge section 8a of the carpet 8 tends thereby be easily stripped from the board 7 and to be degraded in its appearance.

Additionally, when the partition plate 6 is used as a table outdoors, the partition plate 6 is used in a manner such that a surface of the carpet 8 is placed on the ground. Accordingly, the table is unstable on the ground, and the carpet 8 is easily made dirty.

SUMMARY OF THE INVENTION

It is an object of the present invention to provide an improved partition plate which is convenient to use and which maintains an excellent external appearance.

A partition plate of the present invention is used for a luggage compartment of a vehicle. The partition plate comprises a board having first and second surfaces which are opposite to each other, and a side peripheral surface through which the first and second surfaces are connected. A trim member is secured on the first surface. A peripheral section of the trim member extends to the side peripheral surface. A garnish has an installation section at which the garnish is secured to the board, an inner wall section which is integral with the installation section and located inside the installation section, and an outer wall section which is integral with the installation section and located outside the installation section. The inner wall section extends such that it contacts the board second surface. The outer wall section extends to the board side peripheral surface and covers the peripheral section of the trim member.

With this arrangement, the partition plate is largely improved in its external appearance since an end section of the carpet is covered with the trim member so that the peripheral section of the trim member cannot be seen from the outside of the partition plate. Additionally, when the partition plate is used as a table upon being detached from the automotive vehicle, the partition plate serves as a stable table.

DETAILED DESCRIPTION OF THE INVENTION

Figure 1:
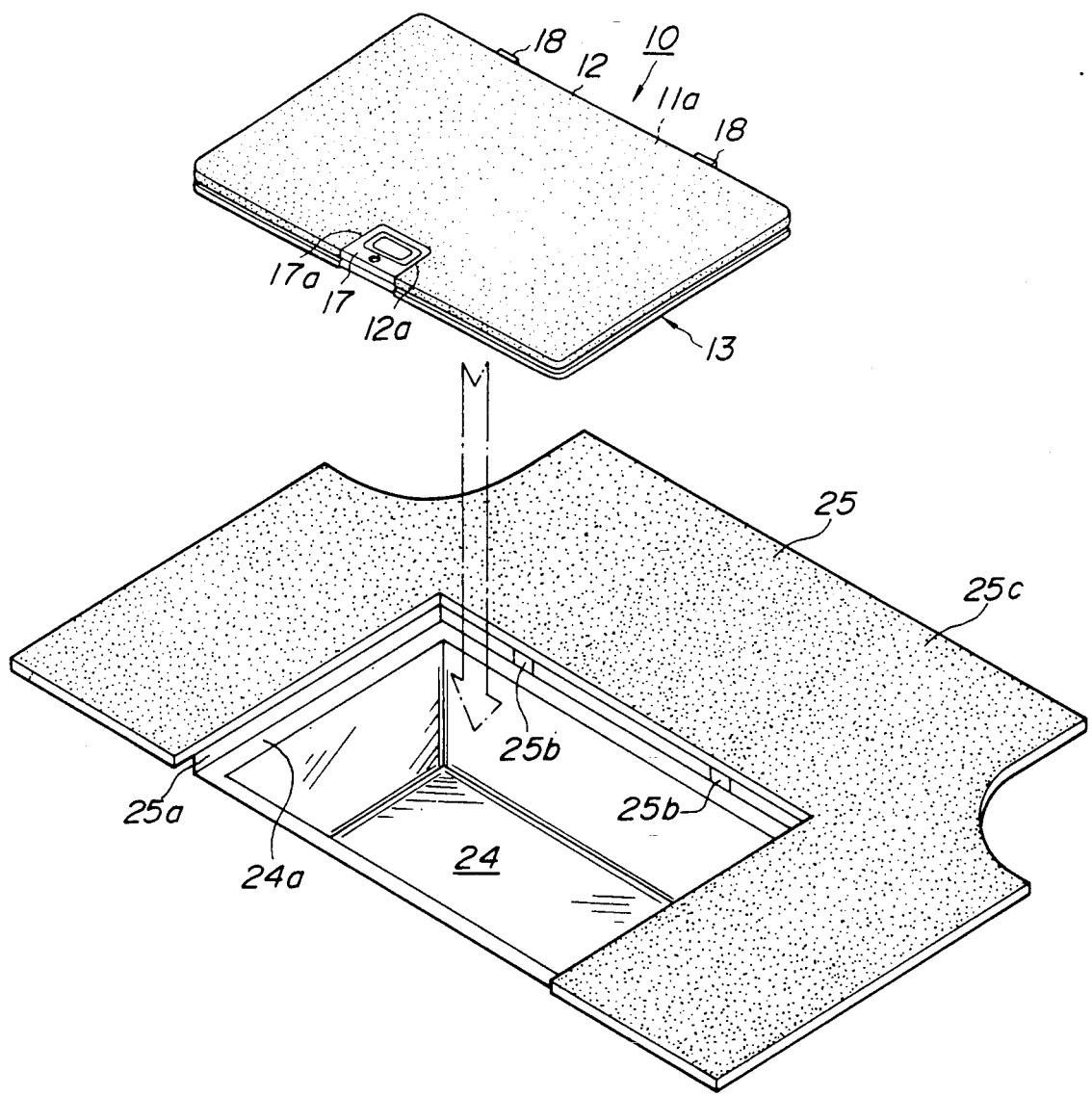
FIG. 1 is a perspective view of an embodiment of a partition plate according to the present invention and a luggage floor.
Figure 2:
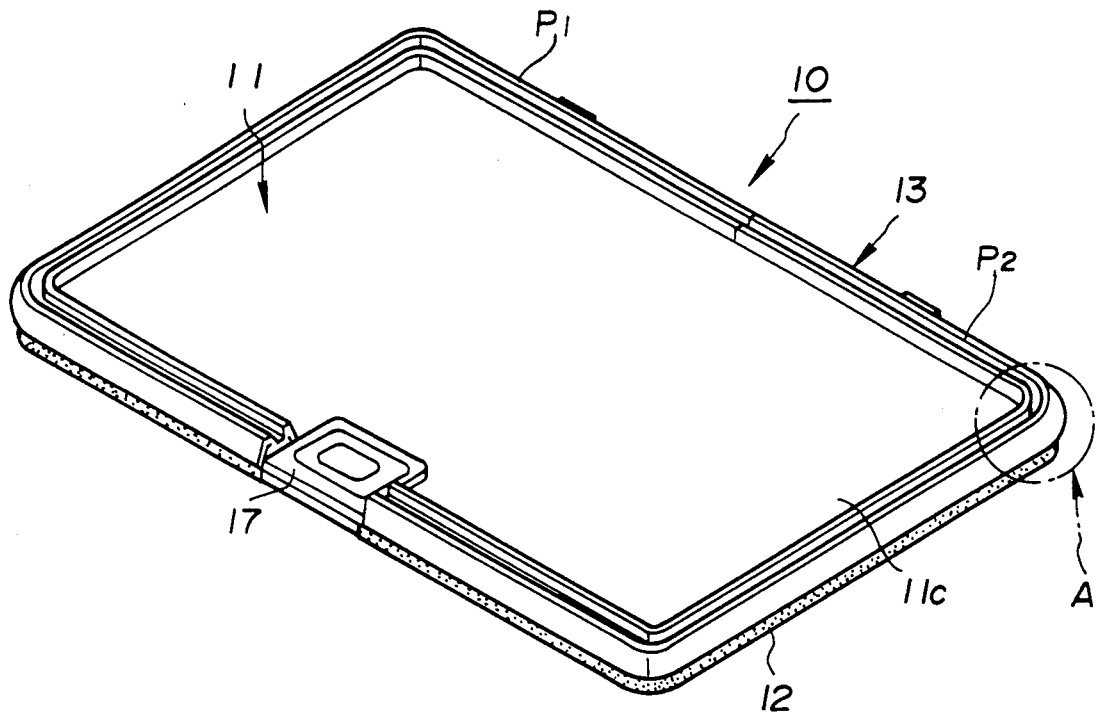
FIG. 2 is another perspective view of the partition plate as viewed from the opposite direction of FIG. 1.
Figure 3:
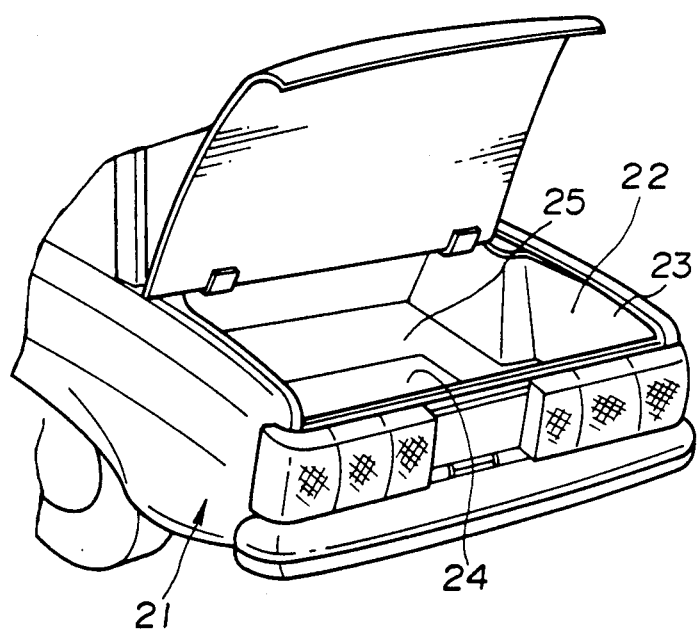
FIG. 3 is a backward perspective view of an automotive vehicle having a partition plate according to the present invention.
Figure 4:
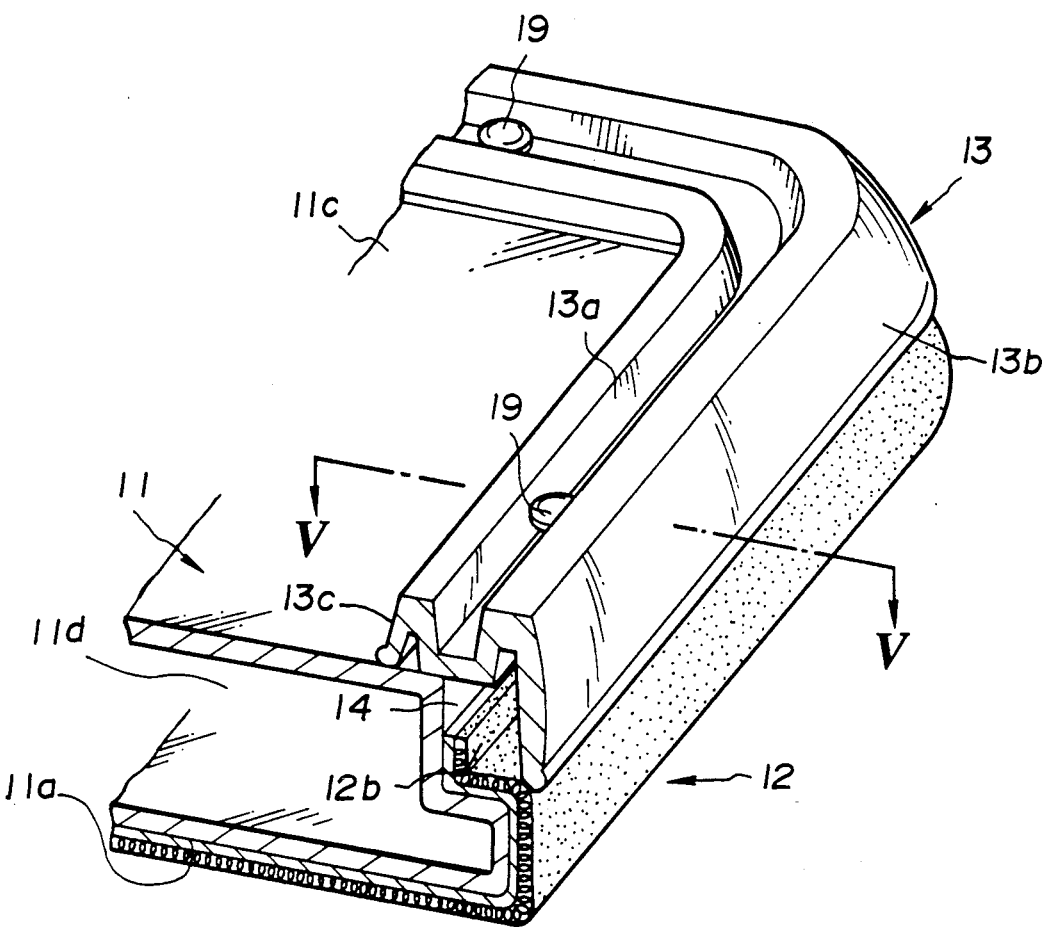
FIG. 4 is a fragmentary enlarged perspective view, partly cut in section, of the partition plate indicated by a circle A in FIG. 2.

Referring now to FIGS. 1 to 4 and 7, an embodiment of the partition plate according to the present invention is illustrated by the reference numeral 10. The partition plate 10 is used for covering a sub-space 24 formed in a luggage compartment 22 of an automotive vehicle 21. The sub-space 24 is located under a main space 23 of the luggage compartment 22 and stores a spare tire and the like therein though not shown. The partition plate 10, of a generally rectangular shape, comprises a board 11 which has such a size as to be fitted with an entrance section 24a of the sub-space 24. The board 11 is formed of a molded plastic member and has a hollow 11d therein.

The board 11 includes a right surface 11a, a reverse surface 11c and a side peripheral surface 11b. The right and reverse surfaces 11a, 11c are parallel with each other, forming the hollow 11d therebetween. The side peripheral surface 11b is integral with the edges of the right and reverse surfaces 11a, 11c so as to sealingly surround the hollow 11d. The side peripheral surface 11b has a first side surface 14 and a second side surface 15. The first side surface 14 perpendicularly extends from and is contiguous to the reverse surface 11c through their end portions. The other end portion of the first surface 14 is contiguous to an end portion of the second side surface 15 through a horizontal surface 16. The second side surface 15 perpendicularly extends and is contiguous to the right surface 11a at their end portions. Thus, the first side surface 14 and the horizontal surface 16 define a peripheral depression (no numeral) which extends throughout the whole periphery of the board 11. The first side surface 14 has a plurality of outwardly protruding parts 14a which have through-holes 14b respectively. The right surface 11a is covered with a carpet 12 serving as a trim member. A peripheral section 12b of the carpet 12 extends to and covers the first side surface 14.

The board 11 is formed with a recess 17a at a middle part of its front side end. A locking device 17 is provided in the recess 17a to be generally flush with the surfaces 11a, 11c of the board 11. A pair of connecting members 18 are projected from the side peripheral surface 11b of an opposite side to the recess 17a of the board 11. Accordingly, the partition plate 11 fits to a section 25a of the luggage floor 25 defining the entrance section 24a of the sub-space 24 in a manner that the connecting members 18 are inserted into holes 25b formed at the section 25a while the locking device 17 is fixedly connected with a projection (not shown) formed on the section 25a.

The carpet 12 is made of the same materials as that of a floor carpet 25c of the luggage floor 25. The carpet 12 is cut in a suitable size so as to cover the right surface 11a and the second side surface 15. The carpet 12 has a cutout (not identified) so that the locking device 17 is not covered with the carpet 12 when the carpet 12 is fixedly fitted on the right surface 11a with adhesive and the like.

Figure 6:
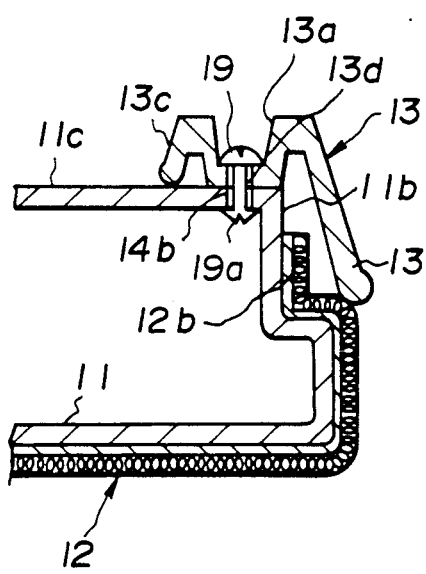
FIG. 6 is a cross-sectional view of the partition plate taken in the direction of arrows substantially along the line V—V of FIG. 2.
Figure 7:
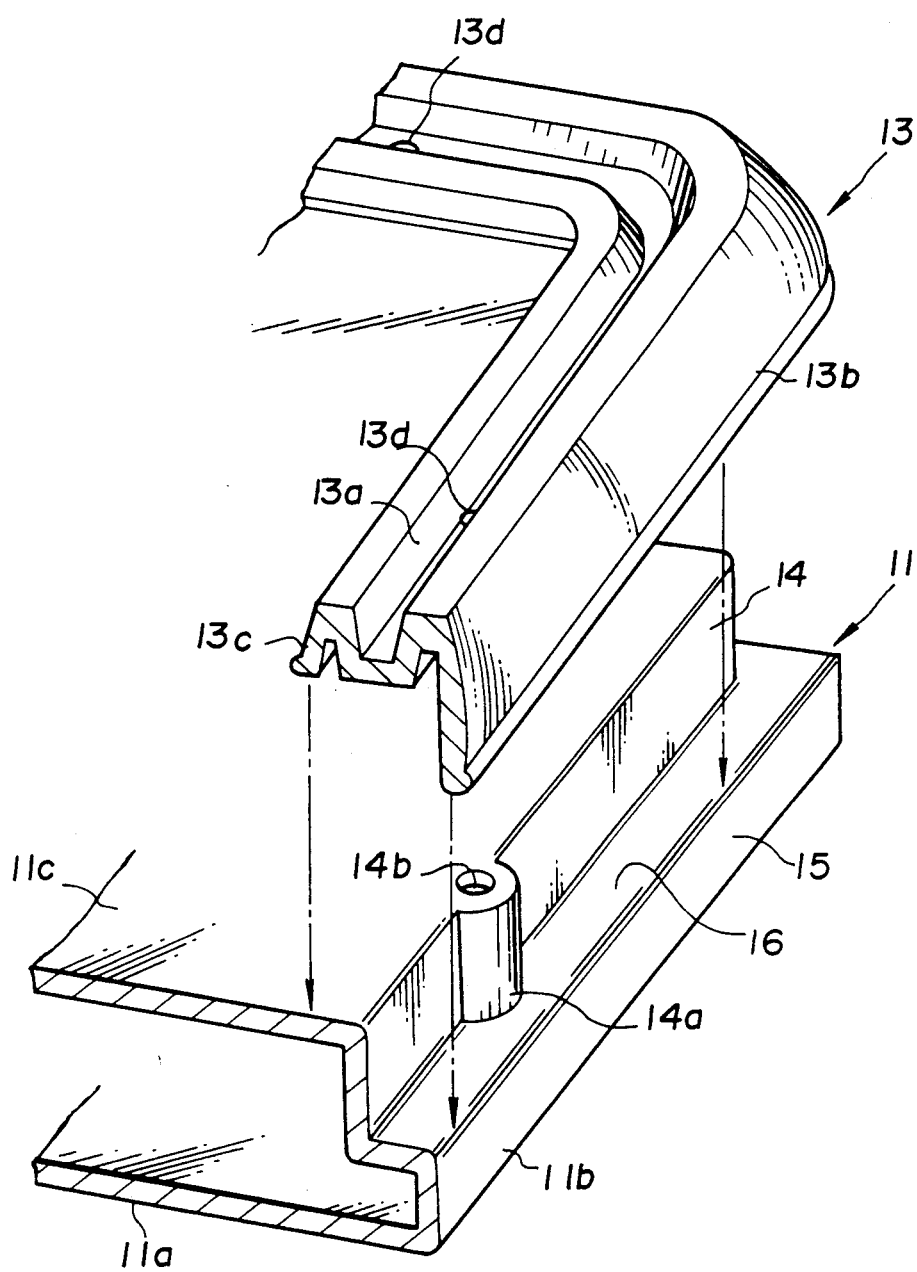
FIG. 7 is an exploded perspective view of the partition plate of FIG. 4.
Figure 8:
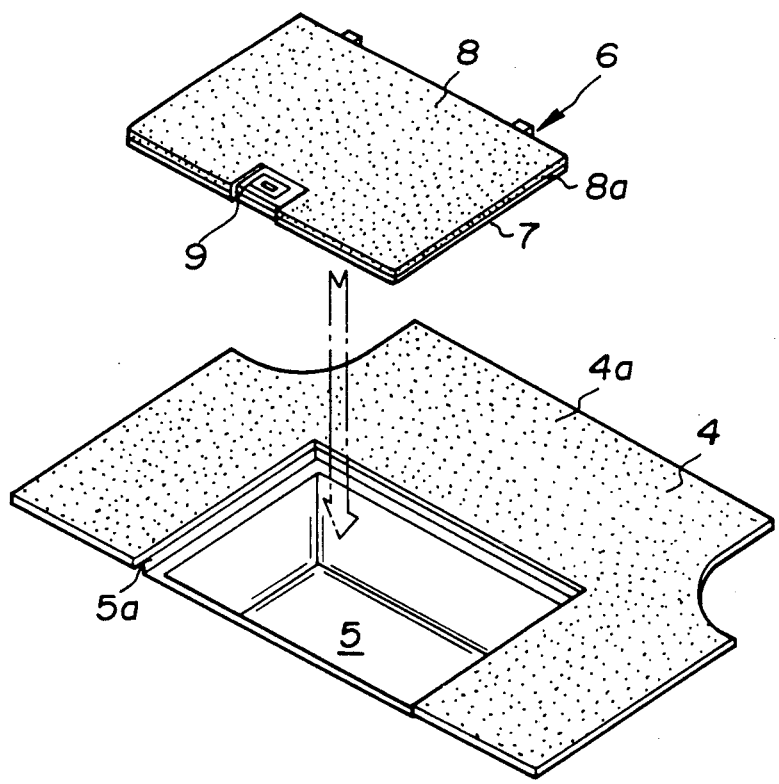
FIG. 8 is a perspective view of the conventional partition plate and a luggage floor of a luggage compartment.

A garnish 13 includes two parts $P_1$, $P_2$ each of which is made of plastics and formed in a generally U-shape. The parts $P_1$, $P_2$ of the garnish 13 are installed on the board 11 in which the parts $P_1$, $P_2$ look like an integral part. As shown in FIG. 6, the garnish 13 has an installation section 13a formed in a U-shaped cross section. The installation section 13a is integrally connected at its outer side end with an outer wall section 13b and at its inner side end with an inner wall section 13c. The installation section 13a has a plurality of installation holes 13d which are arranged corresponding to the though-holes 14b in the board 11. The installation section 13a is installed on a peripheral section of the reverse surface 11c so that the installation holes 13d are located just on the through-holes 14b, respectively. The outer wall section 13b perpendicularly extends to the second side surface 15 to cover the peripheral section 12b of the carpet 12. The inner wall section 13c perpendicularly extends to the reverse surface 11c so that a free end of the inner wall section 13c is tightly contacted with the reverse surface 11c.

An assembly operation for the above-identified partition plate will be discussed hereinafter, referring to FIGS. 5 and 6.

Figure 5:
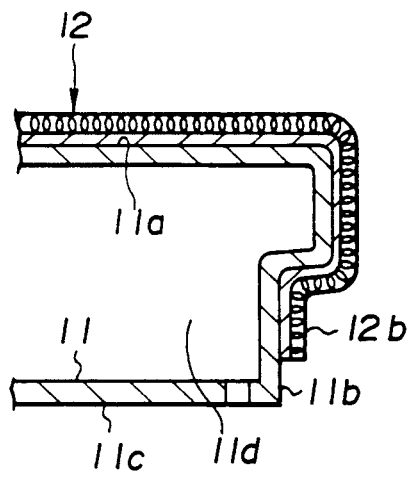
FIG. 5 is a cross-sectional view taken in the direction of arrows substantially along the line V—V of FIG. 4, but showing a condition that a carpet is attached on a board in an assembly operation of the partition plate according to the present invention.

As shown in FIG. 5, the carpet 12, which is cut in a suitable size, is coated at its back surface with adhesive. The carpet 12 is fit onto the right surface 11a of the board 11 so as to cover a part of the side peripheral surface 11b. A position of the carpet 12 relative to the board 11 is not strictly limited since the peripheral section 12b of the carpet 12 is covered with the garnish 13.

As shown in FIG. 6, after the carpet 12 is fit onto the board 11, the garnish 13 is disposed on a peripheral section of the reverse surface 11c so that its through-holes 13d are located just on the installation holes 14d, respectively. A clipping member 19 passes through each of the through-holes 13d and each of the installation holes 14b to interconnect the garnish 13 and the board 11. The clipping member 19 is made of plastics and is formed such that its connecting end section 19a is enlarged in diameter so as to be divided into branches having hooks. Therefore, when the clipping member 19 is inserted into the through-hole 13d and the installation hole 14b, the connecting end section 19a is depressed so as to pass through the holes 13d, 14b. Then, the connecting end 19a outwardly spreads so as to be engaged with an inside surface of the reverse surface 11c with its hooks. Therefore, the garnish 13 is fixedly secured on the board 11. It will be understood that screw bolts (not shown) and the like may be used as a connecting member to interconnect the garnish to the board.

With the thus arranged partition plate, since the peripheral section of the carpet is covered with the garnish, the partition plate is largely improved in its external appearance. Furthermore, since the carpet is not required to be precisely adjusted in position on the board, a fitting operation of the carpet is largely facilitated.

Additionally, when the partition plate is used as a table upon being removed from the luggage compartment of the automotive vehicle, the partition plate according to the present invention serves as follows 1) When the partition plate is used so that the surface of the carpet is located at an upper side, the plate can be stably disposed on the ground and the like without making the carpet dirty. 2) When the partition plate is used so that the surface of the carpet is located at a lower side, the carpet acts as a stopper such as to prevent the table from moving in the horizontal direction.

While only one embodiment has been shown and described, it will be understood that the present invention is not limited by this embodiment and that various deformations and improvements can be applied to this invention. For example, the thus arranged partition plate may be used as a tonneau board with which a passenger room and a luggage compartment are divided. Furthermore, various structures can be applied to the locking device according to the use of the partition plate.

What is claimed is:

1. A partition plate used for a luggage compartment of a vehicle, comprising:

a board having first and second surfaces which are opposite to each other, and a side peripheral surface through which said first and second surfaces are connected;

a trim member secured on said first surface, a peripheral section of said trim member extending to said side peripheral surface; and a garnish having an installation section at which said garnish is secured to said board second surface, an inner wall section which is integral with said installation section and located inside said installation section, said inner wall section extending to be contacted with said board second surface, and an outer wall section which is integral with said installation section and located outside said installation section, said outer wall section extending to said board side peripheral surface and covering the peripheral section of said trim member.

2. A partition plate as claimed in claim 1, wherein said board has a hollow which is located between said first and second surfaces, said side peripheral surface sealingly surrounding said hollow.

3. A partition plate as claimed in claim 1, wherein said board is made of plastics.

4. A partition plate as claimed in claim 1, further comprising a locking device with which said partition plate is fixed on a floor defining said luggage compartment.

5. A partition plate as claimed in claim 1, wherein said garnish is formed with two parts made of plastics.

6. A partition plate as claimed in claim 1, wherein said partition plate is detachable to be used as a table upon being detached from the luggage compartment.

7. A partition plate as claimed in claim 1, wherein said first and second side surfaces are generally perpendicular to said connecting side peripheral surface.

8. A partition plate as claimed in claim 1, wherein said garnish is formed of two generally u-shaped parts made of plastics.

9. A partition plate as claimed in claim 8, wherein said installation section is generally u-shaped and defined between said u-shaped parts.

10. A partition plate as claimed in claim 9, wherein said installation section has a plurality of installation holes which correspond to a plurality of through-holes in said board.

11. A partition plate used for a luggage compartment of a vehicle, comprising:
a board having first and second surfaces which are opposite to each other, and a side peripheral surface through which said first and second surfaces are connected, said side peripheral surface having first and second side surfaces which are connected through a connecting surface;
a trim member secured on said first surface, a peripheral section of said trim member extending to said side peripheral surface; and
a garnish having an installation section at which said garnish is secured to said board, an inner wall section which is integral with said installation section and located inside said installation section, said inner wall section extending to be contacted with said board second surface, and an outer wall section which is integral with said installation section, said outer wall section extending to said board side peripheral surface and covering the peripheral section of said trim member.

12. A partition plate as claimed in claim 11, wherein said inner wall section of said garnish has a free end which is contacted with said second surface, and said outer wall section of said garnish has a free end which is contacted with said second side surface of said side peripheral surface.

13. A partition plate as claimed in claim 11, wherein said first side surface of said side peripheral surface has a plurality of outwardly protruding sections which have through-holes, respectively.

14. A partition plate as claimed in claim 13, wherein said installation section has a plurality of installation holes, said garnish being fixedly interconnected with said board in a manner that connecting members are disposed passing through installation holes and said through-holes.

* * * * *